United States Patent [19]

Yamashita

[11] Patent Number: 5,002,706

[45] Date of Patent: Mar. 26, 1991

[54] INJECTION MOLDING PROCESS OF A PLASTIC SUBSTRATE FOR AN OPTICAL DISK

[75] Inventor: Mitsuru Yamashita, Hyogo, Japan

[73] Assignee: Daicel Chemical Industries, Ltd., Sakai, Japan

[21] Appl. No.: 339,777

[22] Filed: Apr. 18, 1989

[30] Foreign Application Priority Data

Apr. 18, 1988 [JP] Japan .................................. 63-94782

[51] Int. Cl.$^5$ ............................................. B29C 45/56
[52] U.S. Cl. ..................................... 264/2.2; 264/40.5; 264/328.7; 425/149; 425/150
[58] Field of Search .................... 264/328.7, 40.5, 2.2, 264/328.8, 328.13; 425/149, 150

[56] References Cited

FOREIGN PATENT DOCUMENTS 178901 4/1986 European Pat. Off. ........ 264/328.13
61-199919 9/1986 Japan ............................. 264/328.13

Primary Examiner—Jill L. Heitbrink
Attorney, Agent, or Firm—Charles E. Miller

[57] ABSTRACT

A process for molding a transparent plastic substrate for a high-density information recording-reading system by injecting molten resin into a molding cavity defined by a pair of mold halves, characterized in that an axial dimension of the molding cavity is increased at least two times between the start of a shot of the molten resin and the end of the pressure-holding stage in an injection molding cycle.

4 Claims, 1 Drawing Sheet

INJECTION MOLDING PROCESS OF A PLASTIC SUBSTRATE FOR AN OPTICAL DISK

BACKGROUND OF THE INVENTION

1. Field of the Invention

The present invention relates to method for injection-molding a plastic substrate used in high-density information recording carriers or media such as optical disks, optical cards, optical tape or the like. More particularly, it relates to an improvement in an injection-molding process for molding a transparent plastic substrate for DRAW type and Magneto-Optical type recording disks.

2. Description of the Related Art

In the high-density information recording carriers or media such as magneto-optical recording disks in which information is recorded in a form of spots each having a diameter sub-micron order by a laser beam which passes through the plastic substrate and is focused on a recording layer supported on the plastic substrate, it is requested to reduce the birefringence in the transparent plastic substrates.

In the case of the magneto-optical recording system, a very small change of polarized light such as 0/1 to 0.3 degree must be detected and hence the transparent plastic substrates having high birefringence which deteriorate CN ratio (carrier to noise ratio) are not applicable to practical uses.

The transparent plastic substrate is advantageously produced from injection-molded polycarbonate resin because of low cost and low moisture absorbing property thereof. The substrate made of polycarbonate resin, however, shows rather high birefringence values.

In order to lower the birefringence of polycarbonate substrates, injection-compression molding technique is usually used (Japanese patent laid-open No. 62-9,926). Although this technique is very effective to reduce the birefringence, the conventional injection-compression molding technique has such a problem that a fine concave-convex pattern consisting of formatting pits and/or trucking guide grooves engraved on a surface of a stamper by a laser cutting technique is difficult to be transferred precisely onto a surface of the plastic substrate.

Generally, the improvement in the pattern transferring property and the improvement in birefringence conflict with each other.

Still more, in the case of plastic substrates having a large diameter of about 300 mm produced by the conventional injection-compression molding process, the dimensional stability of the molded disks is poor, so that they are apt to twist or bend.

Therefore, it is not easy to produce a transparent plastic substrate which satisfies the three requirements of low birefringence, high pattern transferring property and high dimensional stability simultaneously.

The present applicant proposed improved injection-molding processes for lowering remarkably the birefringence in co-pending Japanese patent application Nos. 61-45,900 and 61-80,189. The present invention was completed in the same line as these patent applications.

An object of the present invention is to provide an improved process for injection-molding a plastic substrate, particularly a substrate made of polycarbonate resin, used in high-density information recording media.

SUMMARY OF THE INVENTION

The present invention provides an improved process for molding a transparent plastic substrate for a high-density information recording-reading reading system by injecting molten resin into a molding cavity defined by a pair of mold halves, characterized in that an axial dimension of the molding cavity is increased at least two times between the start of a shot of the molten resin and the end of the pressure-holding stage in an injection molding cycle.

The pressure-holding stage meands that mold clamping force and/or resin pressure are active in an injection molding cycle.

The increment along the axial dimension of the molding cavity of at least two times is preferably effected within three seconds counting from the start of a shot.

The total increment along the axial dimension of the molding cavity is preferably less than 1/10 of an axial dimension of the molding cavity.

The present invention is advantageously applicable to polycarbonate resin but is also applicable any other thermoplastic resins which same have problems in birefringence, pattern transfering property and/or dimensional stability.

The essence of the present invention reside in such a finding that the control or adjustment along the axial dimension of the molding cavity is a critical factor in order solve the above-mentioned problems, so that the other factors or conditions such as a cylinder temperature, a mold temperature or the like can be selected within the ordinary ranges which are adopted by the persons skilled in the art. Still more, the other operational conditions that have direct relations to the process of the present invention such as an injection pressure, a holding pressure, a mold clamping pressure and a mold cooling rate depend on the size and type of an injection molding machine used. The persons skilled in the art can easily find the optimum operational conditions by experiments.

Now, we will describe the problems to be solved in the injection molding for optical disks in more details.

(a) Birefringence

The birefringence may be caused mainly (1) by molecular orientation due to poor fluidity of polycarbonate and (2) by residual stress along an angular direction owing to shrinkage along the radial direction which occur in a cooling stage of resin.

(b) Transferring property

Transferring property which is defined by an ability or quality to transfer a concave-convex pattern engraved on a surface of the stamper onto a surface of the molded plastic disk. This transfering property may depend on temperatures of the stamper and the mold by which the molding cavity is defined as well as temperature, pressure and residence time in the molding cavity of molten resin.

(c) Dimensional stability

Deformation of the molded plastic substrate is caused by non-uniform distribution of shrinkage. For example, the molded plastic substrate bends like a saucer when an radially inner periphery of the substrate shrinks much larger than an radially outer periphery thereof, and the molded plastic substrate is twisted like a propeller when an radially outer periphery of the substrate shrinks much larger than an radially inner periphery.

Now, we will describe how to solve the problems by the invention with reference to an example of a molding cycle. The present invention is effected just after the molten resin is injected into a molding cavity.

(i) How to improve the transfering property

It may be true that the transfering property can be improved by increasing the pressure of molten resin in the molding cavity provided that the temperatures of stamper, mold and molten resin are kept at constant values. This transfering property, however, is determined in a very short time after the molten resin is injected in the molding cavity. In fact, when the molten resin enter the molding cavity, the molten resin arrived at a surface of the stamper whose temperature is lower than the molten resin is cooled to be solidified almost spontaneously, because the molding cavity is a very narrow flat space. Since the solidification propagate gradually in time along an axial direction or a width-direction of the substrate, it is difficult to transfer the fine engraved pattern of the stamper surface onto the surface of the plastic substrate if a long time pass after a shot, even if the pressure of the molten resin is elevated.

According to the present invention, just after the molten resin is injected into a molding cavity, the pressure of molten resin in an injection cylinder is elevated or increased firstly to a predetermined value while the primary mold clamping force is kept at a constant value.

Therefore, the pressure of resin in the molding cavity is equilibrated with the mold clamping force or the pressure of resin in the molding cavity become higher than the mold clamping force, resulting in that a movable mold half is forced to move along an axial direction so that an dimension of clearance of the molding cavity increases. The primary mold clamping force is selected to such a value as is necessary to transfer satisfactorily the embossed pattern of the stamper onto the substrate surface, while the resin pressure in the cavity is maintained at least for such a time duration as the embossed pattern can be transferred onto the substrate.

Secondly, the pressure of molten resin in the injection cylinder is decreased. This results in that the molten resin in the molding cavity is forced back into the injection cylinder, so that the movable mold half is moved towards the stationary mold half to reduce the axial dimension of the molding cavity. This axial displacement of the movable mold half is caused also by the shrinkage of the resin in the molding cavity.

Thirdly, the mold clamping force is dropped sharply in such a manner that the resin pressure in the molding cavity become higher than the mold clamping force. This results in that the movable mold half is forced to move along the axial direction, so that the axial dimension of the molding cavity increases again.

Finally, the mold clamping force is adjusted to a suitable lower value which can close the molding cavity in order to eliminate a residual stress. In this stage, the resin in the molding cavity is cooled to shrink and have a reduced resin pressure, so that the axial dimension of the molding cavity decreases. The transfering property is little influenced by this final stage since the resin in the molding cavity already become cold.

(ii) How to improve the dimensional stability

Deformation such as bend or twist of the molded plastic substrate is caused by difference in shrinkage between an inner periphery and an outer periphery of the substrate. In order to eliminate the difference in shrinkage, it is proposed to differentiate temperatures at respective mold halves.

According to the present invention, the deformation can be eliminated by the above-mentioned increment of the axial dimension caused by the decrement of resin pressure which is effected after the second stage. In fact, the increment of the axial dimension according to the present invention is effective to make the distribution of resin pressure much uniform so that the deformation of the substrate is eliminated.

(iii) How to lower the birefringence

As mentioned above, the birefringence is caused mainly by molecular orientation and by residual stress. It is said that the molecular orientation occur generally in an injection stage for filling the molding cavity with molten resin.

When the molten resin temperature is very higher than its glass transition temperature, substantially no molecular orientation caused by resin flow or shear stress occur because of low viscosity. Even if it occurs, it will be relaxed easily, so that sever molecular orientation is not left in the substrate. To the contrary, when the molten resin temperature is a little higher than its glass transition temperature, the molecular orientation caused by resin flow or shear stress occur because of the viscosity is high. This molecular orientation is difficult to be relaxed at such lower temperature and is left in the molded substrate. The residual stress occur during a first cooling stage in the molding cavity in which molten resin is cooled to shrink and during second cooling stage in which the molded substrate is cooled in air. Compressive stress is left in the neighborhood of a center of the substrate. This compressive stress decrease gradually along a radial direction and often is turn to a reverse tensile stress.

From these causes of birefringence, it is understand that reduction of the birefringence can be realized (1) by lowering both of the molecular orientation and of the residual stress or (2) by canceling the birefringence caused by the molecular orientation by the birefringence caused by the residual stress.

According to the present invention, the birefringence caused by the molecular orientation can be cancelled by the birefringence caused by the residual stress. Namely, such off-set of two birefringences can be effected by the above-mentioned increment of the axial dimension caused by the decrement of resin pressure which is effected after the second stage, so that the molecular orientation caused by resin flow or shear stress when the molten resin temperature is a little higher than its glass transition temperature is control.

It may be clear that the plastic substrates for optical disks produced by the injection process according to the present invention have improved properties which satisfy the three requirements of low birefringence, high pattern transfering property and high dimensional stability simultaneously.

It is very important advantage of the present invention that the present invention can be carried out in the conventional molding machine only by modifying the control conditions thereof.

Now, an example of the present invention will be described but the present invention is not limited to the example. Namely, all operational factors such as cylinder temperature, injection pressure, injection speed, mold temperature, temperature control profiles of mold or the like can be selected according to the kinds of resins used, their molecular weight, the size and/or type of an injection molding machine used for the persons skilled in the art.

EXAMPLE

Commercially available polycarbonate resin prepared from 2,2-bis(4-hydroxydiphenyl)propane having an average molecular weight of 15,000 was used in an injection molding machine ("Dimamelter" manufactured by MEIKI Seisakusho, M-70).

A nickel stamper on which trucking grooves having a depth of 1,000 Å were cut at a pitch of 1.6 μm was held on a surface of mold halves. A molding cavity had a dimension of 300 mm in diameter and 1.2 mm in thickness.

The injection molding machine was adjusted to a cylinder temperature of 360° C. and a mold temperature of 120° C.

Molten resin is injected from the cylinder into the molding cavity in such manner that a shot required 0.7 second. After then, the resin pressure in the cylinder was kept at 510 kgf/cm$^2$ for 0.4 second and then was decreased to 70 kgf/cm$^2$ for 0.6 second.

While, the mold clamping force was set at 190 ton before the shot. After 1.7 seconds from the start of the shot, the mold clamping force was dropped sharply down to 35 ton.

Figure 1:
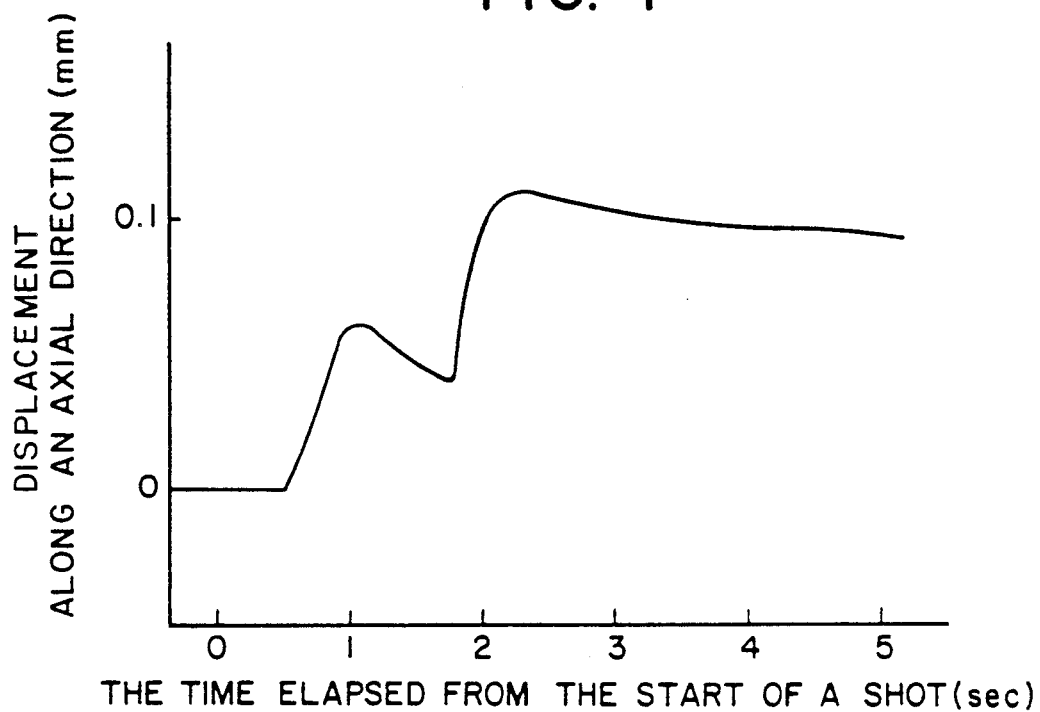
FIG. 1 illustrates time dependency of the axial displacement of the mold measured at a parting line of a movable mold half in Example 1.

FIG. 1 illustrates the time dependency of the axial displacement of the mold measured at a parting line of the mold. This figure shows such a fact that an axial dimension or clearance of the molding cavity increased or enlarged two times within 3 seconds counting from the start of the short. It is apparent that the amount of the axial displacement of the mold corresponds to the amount of the axial dimension or clearance of the molding cavity.

The molded plastic disk was removed out of the mold after 20 second counting from the end of the shot.

Figure 2:
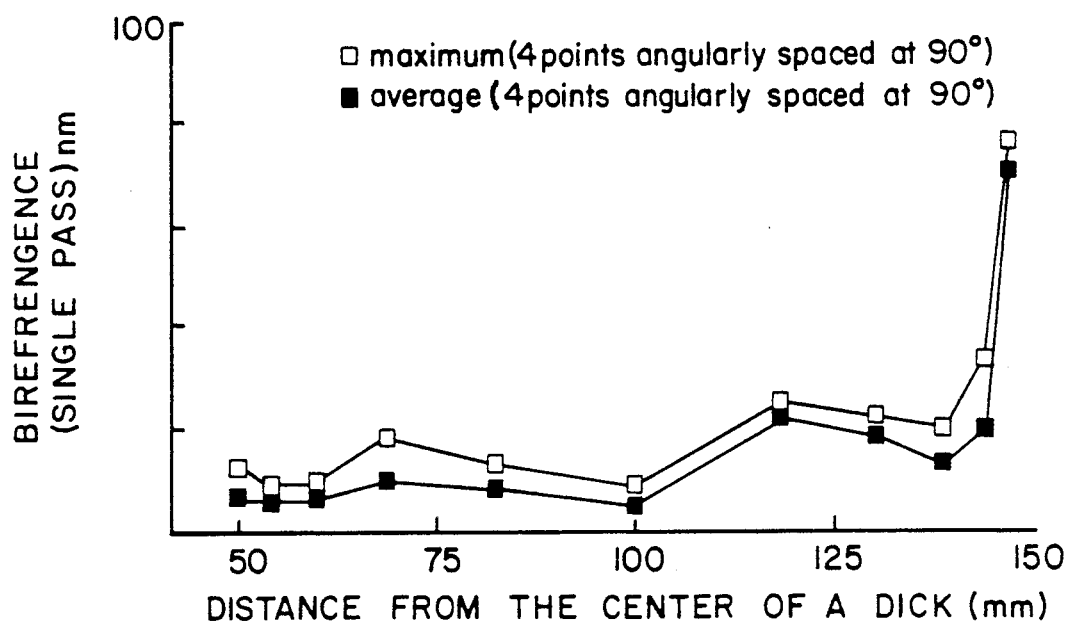
FIG. 2 illustrates a graph showing a relation between the values of birefringence determined by passing a linearly polarized helium-neon laser (wave length of 6,328 Å) through the plastic disk substrate produced in Example 1 and the radii of the plastic disk.

The values of birefringence was determined by passing a linearly polarized helium-neon laser (wave length of 6,328 Å) through the plastic disk substrate obtained. The result is shown in FIG. 2 (the values of birefringence are expressed by absolute values). It is apparent that the substrate obtained according to the present invention possesses a very low birefringence value.

Still more, the substrate obtained showed no deformation such as bend or twist and has a surface of embossed trucking grooves which were well-transferred from the stamper.

I claim:

1. A process for molding a transparent plastic substrate for a high-density information recording-reading system by injecting molten resin into a molding cavity defined by a pair of mold halves, comprising the step of increasing an axial dimension of said molding cavity at least two times between the start of a shot of the molten resin and the end of the pressure-holding stage in an injecting molding cycle and decreasing the axial dimension of said molding cavity between the first and the last increase in axial dimension.

2. The process set forth in claim 1 wherein the increase along the axial dimension of said molding cavity is effected at least two times within three seconds counting from the start of a shot.

3. The process set forth in claim 1 wherein the total displacement, along the axial dimension of said molding cavity is less than 1/10 of an axial dimension of said molding cavity.

4. The process set forth in claim 1 wherein the resin is polycarbonate.

* * * * *